(12) United States Patent
Yamasaki et al.

(10) Patent No.: US 8,895,136 B2
(45) Date of Patent: Nov. 25, 2014

(54) TRANSPARENT CONDUCTIVE FILM

(71) Applicant: Nitto Denko Corporation, Ibaraki-shi, Osaka (JP)

(72) Inventors: Mizue Yamasaki, Osaka (JP); Tomotake Nashiki, Osaka (JP); Kuniaki Ishibashi, Osaka (JP)

(73) Assignee: Nitto Denko Corporation, Ibaraki-shi (JP)

( * ) Notice: Subject to any disclaimer, the term of this patent is extended or adjusted under 35 U.S.C. 154(b) by 133 days.

(21) Appl. No.: 13/652,910

(22) Filed: Oct. 16, 2012

(65) Prior Publication Data

US 2013/0092425 A1 Apr. 18, 2013

(30) Foreign Application Priority Data

Oct. 18, 2011 (JP) ................... 2011-228660

(51) Int. Cl.
*B32B 3/00* (2006.01)
*G06F 3/044* (2006.01)
*H01B 5/14* (2006.01)
*B32B 7/12* (2006.01)
*G02B 5/30* (2006.01)

(52) U.S. Cl.
CPC . *G06F 3/044* (2013.01); *B32B 7/12* (2013.01); *B32B 3/00* (2013.01); *G02B 5/30* (2013.01); *H01B 5/14* (2013.01)
USPC ....................................... 428/195.1; 428/201

(58) Field of Classification Search
CPC .................................... B32B 7/12; G02B 5/30
USPC ....................................................... 428/195.1
See application file for complete search history.

(56) References Cited

U.S. PATENT DOCUMENTS

2008/0029292 A1* 2/2008 Takayama et al. ......... 174/126.4

FOREIGN PATENT DOCUMENTS

JP 2009-070191 A 4/2009

* cited by examiner

*Primary Examiner* — Elizabeth Mulvaney
(74) *Attorney, Agent, or Firm* — Westerman, Hattori, Daniels & Adrian, LLP

(57) ABSTRACT

A transparent conductive film which comprises: a transparent adhesive layer; a first polycycloolefin film laminated on one surface of the transparent adhesive layer; a second polycycloolefin film laminated on the other surface of the transparent adhesive layer; a plurality of first transparent electrode patterns formed on the first polycycloolefin film; and a plurality of second transparent electrode patterns formed on the second polycycloolefin film. The transparent conductive film shows little color phase irregularity when observed from any direction.

7 Claims, 1 Drawing Sheet

A-A Cross Section

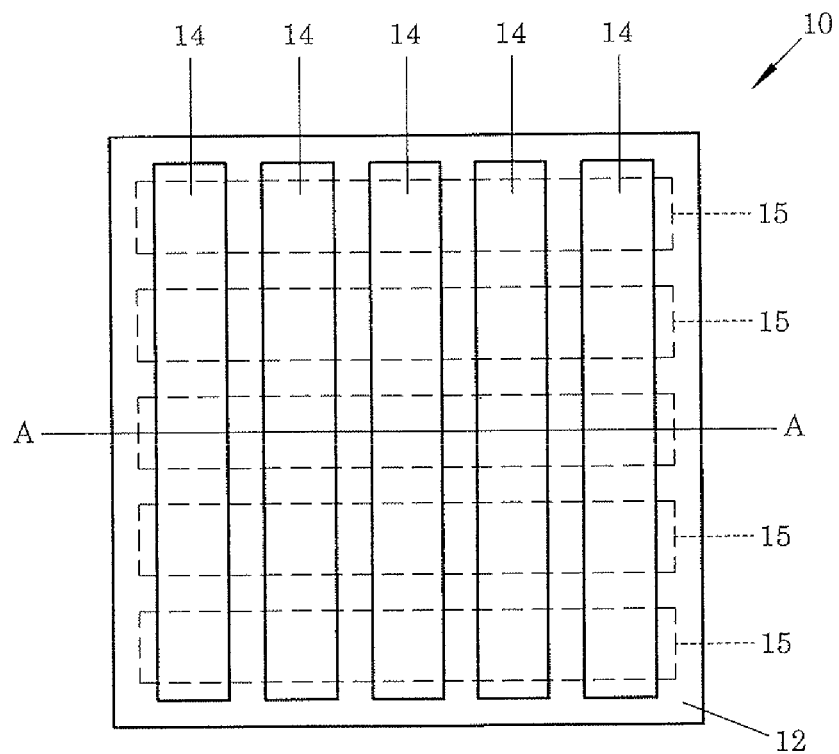
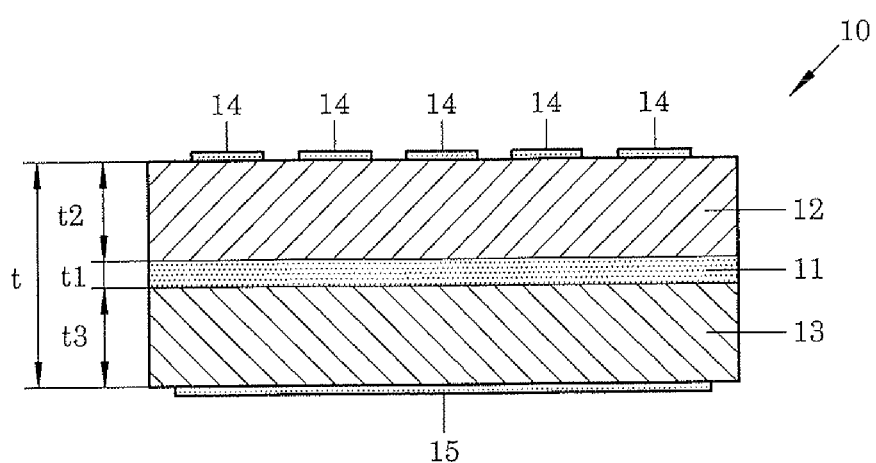
A-A Cross Section

TRANSPARENT CONDUCTIVE FILM

BACKGROUND OF THE INVENTION

1. Field of the Invention

The present invention relates to a transparent conductive film used, for example, in a capacitance-type touch panel.

2. Description of Related Art

A transparent conductive film has been known wherein transparent electrode patterns are formed on both sides of a laminated film which is formed by bonding two polyethylene terephthalate films using a transparent acrylic acid based adhesive (for example, JP-A-2009-70191). In conventional transparent conductive films, however, a phase difference value in the surface of polyethylene terephthalate is as large as not less than 2,000 nm so that iridescent color phase irregularity occurs when diagonally observed.

SUMMARY OF THE INVENTION

The object of the present invention is to substantialize a transparent conductive film which shows little color phase irregularity when observed from any direction.

The summary of the present invention is as below.

In a first preferred aspect, a transparent conductive film according to the present invention comprises: a transparent adhesive layer; a first polycycloolefin film; a second polycycloolefin film; a plurality of first transparent electrode patterns; and a plurality of second transparent electrode patterns. The first polycycloolefin film is laminated on one surface of the transparent adhesive layer. The second polycycloolefin film is laminated to the other surface of the transparent adhesive layer. The plurality of first transparent electrode patterns are formed on a surface of the first polycycloolefin film, opposed to the transparent adhesive layer. The plurality of second transparent electrode patterns are formed on a surface of the second polycycloolefin film, opposed to the transparent adhesive layer.

In a second preferred aspect of the transparent conductive film according to the present invention, the first polycycloolefin film and the second polycycloolefin film respectively have an in-plane phase difference value of not more than 20 nm at a wavelength of 590 nm.

In a third preferred aspect of the transparent conductive film according to the present invention, the first polycycloolefin film and the second polycycloolefin film respectively have a dielectric constant of 2.1 to 2.5 at 1 MHz.

In a fourth preferred aspect of the transparent conductive film according to the present invention, the first polycycloolefin film and the second polycycloolefin film respectively have a transmittance of not less than 85% at a wavelength of 590 nm.

In a fifth preferred aspect of the transparent conductive film according to the present invention, the first transparent electrode patterns and the second transparent electrode patterns are formed from any of indium tin oxide (ITO), indium zinc oxide or indium oxide-zinc complex oxide.

In a sixth preferred aspect of the transparent conductive film according to the present invention, the transparent adhesive layer is a pressure-sensitive adhesive layer or a curing adhesive layer.

In a seventh preferred aspect of the transparent conductive film according to the present invention, the pressure sensitive adhesive layer is an acrylic adhesive layer.

In an eighth preferred aspect of the transparent conductive film according to the present invention, the curing adhesive layer is an ultraviolet curing type adhesive layer.

Advantage of the Invention

According to the present invention, it is possible to obtain a transparent conductive film which shows little color phase irregularity when observed from any direction.

BRIEF DESCRIPTION OF THE DRAWING

FIG. 1 shows a plan view and a cross-sectional diagram of a transparent conductive film of the present invention.

DESCRIPTION OF THE PREFERRED EMBODIMENTS

The preferred embodiments of the present invention will now be described with reference to FIG. 1. Identical elements in the FIGURE are designated with the same reference numerals.

The inventors of the present invention have developed, as a result of intensive study to solve the above-described problems, a transparent conductive film wherein a plurality of transparent electrode patterns are formed on both sides of a laminated film which is formed by bonding two polycycloolefin films using a transparent adhesive layer. This transparent conductive film shows little color phase irregularity when observed from any direction.

<Transparent Conductive Film>

As shown in FIG. 1, a transparent conductive film 10 of the present invention comprises: a transparent adhesive layer 11; a first polycycloolefin film 12; a second polycycloolefin film 13; a plurality of first transparent electrode patterns 14; and a plurality of second transparent electrode patterns 15. The first polycycloolefin film 12 is laminated on one surface of the transparent adhesive layer 11 (the top surface in FIG. 1). The second polycycloolefin film 13 is laminated on the other surface of the transparent adhesive layer 11 (the bottom surface in FIG. 1). The plurality of first transparent electrode patterns 14 are formed on a surface of the first polycycloolefin film 12, opposed to the transparent adhesive layer 11 (the top surface in FIG. 1). The plurality of second transparent electrode patterns 15 are formed on a surface of the second polycycloolefin film 13, opposed to the transparent adhesive layer 11 (the bottom surface in FIG. 1).

<Polycycloolefin Film>

The first polycycloolefin film 12 to be used in the present invention is obtained by subjecting, typically, dicyclopentadiene or derivatives thereof to ring opening metathesis polymerization and hydrogenation, and forming the resulting polymer into a film state. The second polycycloolefin film 13 is also obtained in a similar manner to the first polycycloolefin film 12. Same kinds of polycycloolefin films may be used as the first polycycloolefin film 12 and the second polycycloolefin film 13. As a polycycloolefin film to be used in the present invention, a polycycloolefin film commercially sold, for example, by ZEON CORPORATION can be utilized.

A polycycloolefin film has features of high transparency and a small in-plane phase difference. Therefore, the transparent conductive film of the present invention using polycycloolefin film shows little color phase irregularity even if observed from a diagonal direction. The polycycloolefin film typically has a transmittance of not less than 85% at a wavelength of 590 nm, and typically has an in-plane phase difference value of not more than 20 nm at a wavelength of 590 nm.

In addition, the polycycloolefin film has a feature of a low dielectric constant. In comparison with other polymer films, the dielectric constant (specific dielectric constant) of the polycycloolefin film is 2.1 to 2.5 (typically 2.3) at 1 MHz whereas that of a polyethylene terephthalate film is 3.2, and that of a polycarbonate film is 2.9. Accordingly, the transparent conductive film of the present invention has high touch sensitivity when used as a capacitance-type touch panel. In a capacitance-type touch panel, the change in capacitance caused by the access of a finger to the transparent conductive film is very small. Therefore, smaller capacitance between electrodes leads to a larger rate of change in capacitance, resulting in high touch sensitivity. The capacitance between electrodes is proportional to the dielectric constant of a polymer film between electrodes. Accordingly, the use of the polycycloolefin film having a low dielectric constant reduces capacitance between electrodes.

To enhance the touch sensitivity of a capacitance-type touch panel, it is preferable that the distance between the first transparent electrode patterns 14 and the second transparent electrode patterns 15 (referred to as an inter-electrode distance) is long to a certain extent. Capacitance between electrodes is nearly reversely proportional to the inter-electrode distance. Accordingly, as inter-electrode distance increases, capacitance between electrodes decreases and the rate of change in capacitance on the access of a finger becomes large to enhance touch sensitivity. In FIG. 1, the distance between the first transparent electrode patterns 14 and the second transparent electrode patterns 15 (inter-electrode distance t) is the total of the thickness t2 of the first polycycloolefin film 12, the thickness t1 of the transparent adhesive layer 11, and the thickness t3 of the second polycycloolefin film 13 (t=t2+t1+t3). From the view point of obtaining an appropriate inter-electrode distance t, the thickness t2 of the first polycycloolefin film 12 is preferably 20 µm to 200 µm, more preferably 40 µm to 200 µm, especially preferably 50 µm to 200 µm. The preferable thickness t3 of the second polycycloolefin film 13 is similar to the thickness t2 of the first polycycloolefin film 12.

Generally, because a phase difference in a polymer film is proportional to its thickness, increasing the thickness of a polymer film tends to bring about the occurrence of color phase irregularity. The polycycloolefin film to be used in the present invention, however, shows little color phase irregularity even if the thickness increases because the phase difference is small enough. Accordingly, in order to enhance the touch sensitivity, the thickness of polycycloolefin film and when necessary the inter-electrode distance t can be easily increased.

The first polycycloolefin film 12 may comprise an easily adhering layer (not shown) for enhancing adhesiveness to the transparent electrode patterns 14, an index matching layer (not shown) for adjusting reflectivity, a hard coated layer (not shown) for imparting resistance to abrasion and others on one or both of the surfaces. The second polycycloolefin film 13 does in a similar manner.

<Transparent Adhesive Layer>

In order to bond the first polycycloolefin film 12 and the second polycycloolefin film 13, the transparent adhesive layer 11 to be used in the present invention is provided between them. The transparent adhesive layer 11 is, preferably, a pressure-sensitive adhesive layer or a curing adhesive layer. The thickness t1 of the transparent adhesive layer 11 is preferably 15 µm to 50 µm when it is a pressure sensitive adhesive layer, and preferably 0.1 µm to 10 µm when it is a curing adhesive layer.

The pressure sensitive adhesive layer is preferably an acrylic adhesive layer. Commercial Optical Clear Adhesive (OCA) may be also used. The curing adhesive layer is preferably an ultraviolet curing type adhesive layer. The ultraviolet curing type adhesive layer can be cured at a temperature not adversely affecting the laminated polycycloolefin film. As the polycycloolefin film transmits light efficiently at a wavelength of 365 nm from a light source (for example, a high pressure mercury lamp) utilized to cure ultraviolet curing type adhesive, ultraviolet curing type adhesive can be cured in a short period of time.

<Transparent Electrode Pattern>

The first transparent electrode patterns 14 and the second transparent electrode pattern 15 to be used in the present invention are used as a sensor for detecting the position of a touch. The first transparent electrode patterns 14 are usually electrically connected to wirings (not shown) arranged in the periphery of the first polycycloolefin film 12, the wirings being connected to a controller IC (not shown). The second transparent electrode patterns 15 are in a similar state.

Either the first transparent electrode patterns 14 or the second transparent electrode patterns 15 are arranged as X-coordinate electrodes, and the other as Y-coordinate electrodes in a grid-like fashion. The shape of the first transparent electrode patterns 14 is arbitrary such as stripe-shaped (FIG. 1) or rhombic (not shown). The shape of the second transparent electrode patterns 15 is similar one.

The first transparent electrode patterns 14 and the second transparent electrode patterns 15 are formed typically by a transparent conductor. The transparent conductor means a material which has a high transmittance (not less than 80%) in visible light region (380 nm to 780 nm) and a surface resistance value per unit area (unit: Q per square) not more than 500Ω per square. A transparent conductor is formed, for example, from indium tin oxide (ITO), indium zinc oxide, or indium oxide-zinc complex oxide. The thickness of the first transparent electrode patterns 14 is preferably 10 nm to 100 nm, more preferably 10 nm to 50 nm. The thickness of the second transparent electrode patterns 15 is the same.

After a transparent conductor layer is formed on the first polycycloolefin film 12, for example, by a sputtering method or a vacuum evaporation method, a photoresist in desired pattern can be formed on a surface of the transparent conductor layer, and immersed in hydrochloric acid to remove the unnecessary part of the transparent conductor layer to obtain the first transparent electrode patterns 14. The second transparent electrode patterns 15 can be also obtained in the same way.

EXAMPLES

Using a sputtering apparatus having a sintered target of indium-tin oxide containing 97% by weight of indium oxide and 3% by weight of tin oxide, an indium tin oxide layer with a thickness of 27 nm was formed on one surface of a polycycloolefin film. A "ZEONOR" (registered trade mark) film made by ZEON CORPORATION was used as a polycycloolefin film. The thickness of polycycloolefin film is 60 µm, the dielectric constant is 2.3 at 1 MHz, the in-plane phase difference value at a wavelength of 590 nm is 3 nm.

Two polycycloolefin films were prepared, which respectively had an indium tin oxide layer formed on one surface. One of them is the first polycycloolefin film 12, the other is the second polycycloolefin film 13. A laminated body was produced by bonding each polycycloolefin film to an ultraviolet curing type adhesive layer of 5 µm thick (DA-141 made by Nagase ChemteX Corporation) with the respective indium tin oxide layers being outside, and by irradiating with ultraviolet ray (wavelength 365 nm) using a high-pressure mercury lamp to cure the ultraviolet curing type adhesive layer.

In a state in which one of the indium tin oxide layers of the above-described laminated body was protected by a protection film (an acrylic adhesive-coated polyester film made by Sun A-Kaken Co., Ltd.), a stripe-shaped photoresist pattern was formed on the surface of the other indium tin oxide layer. By immersing the laminated body in hydrochloric acid to remove the unnecessary indium tin oxide layer, stripe-shaped transparent electrode patterns (width 2 mm, pitch 6 mm) were formed. Then, by subjecting the other indium tin oxide layer of the laminated body to the above-described operation to form stripe-shaped transparent electrode patterns on the outside of each polycycloolefin film, a transparent electric conductive film was produced.

In the obtained transparent conductive film, the thickness t2 of the first polycycloolefin film was 60 μm, the thickness t1 of the transparent adhesive layer was 5 μm, the thickness t3 of the second polycycloolefin film was 60 μm, thus the inter-electrode distance t was 60 μm+5 μm+60 μm=125 μm.

The obtained transparent conductive film showed little color phase irregularity when observed from a diagonal direction. Because a polycycloolefin film with a low dielectric constant (2.3 at 1 MHz) was used, touch sensitivity was higher in the case where this transparent conductive film was used in a capacitance-type touch panel than in the case where a conventional transparent conductive film was used.

INDUSTRIAL APPLICABILITY

Although the application of the transparent conductive film of the present invention is not restricted, the transparent conductive film of the present invention can be favorably used in a capacitance-type touch panel, especially in a capacitance-type touch panel which is of projection type.

This application claims priority from Japanese Patent Application No. 2011-228660, which is incorporated herein by reference.

There has thus been shown and described a novel transparent conductive film which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A transparent conductive film comprising:
   a transparent adhesive layer;
   a first polycycloolefin film laminated on one surface of the transparent adhesive layer;
   a second polycycloolefin film laminated on the other surface of the transparent adhesive layer;
   a plurality of first transparent electrode patterns formed on a surface of the first polycycloolefin film, opposed to the transparent adhesive layer; and
   a plurality of second transparent electrode patterns formed on a surface of the second polycycloolefin film, opposed to the transparent adhesive layer
   wherein the first polycycloolefin film and the second polycycloolefin film respectively have an in-plane phase difference value of not more than 20 nm at a wavelength of 590 nm.

2. The transparent conductive film according to claim 1, wherein the first polycycloolefin film and the second polycycloolefin film respectively have a dielectric constant of 2.1 to 2.5 at 1 MHz.

3. The transparent conductive film according to claim 1, wherein the first polycycloolefin film and the second polycycloolefin film respectively have a transmittance of not less than 85% at a wavelength of 590 nm.

4. The transparent conductive film according to claim 1, wherein the plurality of first transparent electrode patterns and the plurality of second transparent electrode patterns are formed from either indium tin oxide (ITO), indium zinc oxide, or indium oxide-zinc complex oxide.

5. The transparent conductive film according to claim 1, wherein the transparent adhesive layer is one of a pressure-sensitive adhesive layer and a curing adhesive layer.

6. The transparent conductive film according to claim 5, wherein the pressure-sensitive adhesive layer is an acrylic adhesive layer.

7. The transparent conductive film according to claim 5, wherein the curing adhesive layer is an ultraviolet curing type adhesive layer.

* * * * *